United States Patent Office 3,533,972
Patented Oct. 13, 1970

3,533,972
POLYURETHANE COATINGS
Joseph A. Pawlak, Cheektowaga, Buffalo, and Edward J. Quinn, Tonawanda, N.Y., assignors to Hooker Chemical Corporation, Niagara Falls, N.Y., a corporation of New York
No Drawing. Filed Mar. 28, 1966, Ser. No. 537,650
Int. Cl. G08g 5/20
U.S. Cl. 260—19
20 Claims

ABSTRACT OF THE DISCLOSURE

This invention relates to a polyurethane composition produced by reacting an equivalent excess of an organic polyisocyanate with one equivalent of a polyhydroxy composition, wherein the polyhydroxy composition comprises a polyol formed by adjusting the acidity of the hydroxyalkylated novolac resin of a phenol and a carbonyl compound selected from the group consisting of an aldehyde and a ketone with phosphoric acid to an acid number in the range of about 0.2 to about 10, and heating the resulting product to a temperature of at least 100 degrees centigrade. The polyurethane composition is useful in polyurethane coating compositions which can be applied to various substrates such as metal, wood, ceramics, glass, and to polymer compositions.

This invention relates to improved polyurethane coatings, to the process for making such coatings, and to the cured coatings that can be produced therefrom.

It is the object of this invention to provide novel polyurethane coating compositions that can be cured by atmospheric moisture or by suitable polyols to provide cured coatings that have excellent corrosion resistance and improved adhesion to metal surfaces. It is a further object of the invention to provide polyurethane coating compositions that cure to finished coatings that have an excellent balance of physical properties such as hardness, mar resistance, color, flexibility and wear resistance. These and other objects of the invention are apparent from the following detailed specification.

In accordance with this invention there is provided a polyurethane coating composition produced by reacting an equivalent excess of an organic polisocyanate with one equivalent of a polyhydroxy composition, wherein the polyhydroxy composition comprises a polyol formed by adjusting the acidity of a hydroxyalkylated phenol-aldehyde or phenol-ketone novolak resin with phosphoric acid, heating the resulting product to a temperature of at least 160 degrees centigrade to precipitate undesirable impurities, and thereafter separating the precipitate from the product. Generally, the reaction of the organic polyisocyanate and polyol is carried out in the presence of a suitable solvent which also serves as a liquid medium or diluent for the polyurethane coating composition. The resulting products are readily curable by atmospheric moisture to provide the cured polyurethane coating. Alternatively, the products can be cured by reaction with suitable polyols.

Suitable hydroxyalkylated novolak resins for use in the invention are generally prepared by reacting a phenol with an aldehyde or keytone to provide the novolak resin, and thereafter reacting the phenolic hydroxyl groups of the novolak resin with a suitable hydroxy-alkylation agent such as a monooxirane ring compound, an alkylene halohydrin or an alkylene carbonate. The novolak resins generally contain an average of three to about 10 phenolic nuclei per molecule, preferably an average of three to about seven phenolic nuclei per molecule and still more preferably from an average of three to about five phenolic nuclei per molecule. The phenol-aldehyde and phenol-ketone condensates are characterized by being soluable in organic solvents such as acetone, and should not be advanced to the insoluble "C" stage or resite stage.

The phenol for use in preparing the novolak resins for use in the invention is phenol itself, since hydrocarbon substituted phenols generally result in less desirable polyurethane coating compositions when use of in the process of the invention. Any suitable aldehyde or mixtures of aldehydes capable of reacting with phenol and having up to about eight carbon atoms is satisfactory provided that it does not contain a functional group that is detrimental to the condensation reaction or to the subsequent steps of oxyalkylation and reaction with the organic polyisocyanate. The preferred aldehyde is formaldehyde, which can be an aqueous solution or in any of its lower polymeric forms such as paraform or trioxane. Other examples of suitable aldehydes are acetaldehyde, propionaldehyde, butyraldehyde, benzaldehyde, furfurylaldehyde, 2-ethylhexanal, ethylbutyraldehyde, heptaldehyde, and the like. The condensation of the penols can also be carried out using an aliphatic ketone having three to eight carbon atoms in either aliphatic radical, such as acetone, methylethyl ketone, diethyl ketone, ethylpropyl ketone, dipropyl ketone, propylbutyl ketone, as well as cycloaliphatic ketones having five to eight carbon atoms, such as cyclopentanone, cyclohexanone, and cyclooctanone, and the like.

The condensation reaction of phenol and the aldehyde or ketone is preferably carried out in the presence of an acid catalyst, such as oxalic acid, maleic acid, hydrochloric acid, sulfuric acid, and the like. In general, any acid having a dissociation constant of greater than $1 \times 10^{-2}$ is useful as a catalyst for the condensation reaction. The reaction can also proceed without a catalyst. In such case, the aldehyde should be introduced beneath the surface of the liquid at a temperature of 150 to 180 degrees centigrade. It is generally preferable to conduct the reaction in the presence of an anionic-type wetting agent, such as a sodium alkyl aryl sulfonate. The phenol and aldehyde or ketone are generally reacted in a ratio of greater than 0.25 up to nearly 1 mole of aldehyde or ketone per mole of phenol, preferably in the range of about 0.4 to about 0.7 mole of aldehyde or ketone per mole of phenol, more preferably in the range of 0.6 to 0.7 mole per mole. The reaction is generally conducted at a temperature of about 95 to 100 degrees centigrade (reflux temperature) under atmospheric pressure. However, higher and lower pressures can be employed, and the reaction temperature can be adjusted to higher or lower levels as required. The reaction is continued until all the aldehyde or ketone is reacted, after which the reaction mixture is preferably dehydrated and dephenolated by distillation at atmospheric pressure or at reduced pressure to provide the desired novolak resin.

Hydroxyalkylation of the novolak resin is accomplished with a hydroxyalkylating agent such as a monooxirane ring compound, an alkylene halohydrin or an alkylene carbonate. Examples of monooxirane ring compounds are the monomeric 1,2-epoxides such as ethyleneoxide, propyleneoxide, butyleneoxide, isobutyleneoxide, 2,3-epoxyhexane, 3-ethyl-2,3-epoxyoctane, epichlorohydrin, epibromohydrin, styrene oxide, glycidyl ether, methyl glycidyl ether, phenyl glycidyl ether, glycidyl methyl sulfone, glycidyl methacrylate, glycidyl benzoate, glycidyl acetate, glycidyl sorbate, and the like. The preferred monoepoxides are the alkylene oxides of 2 to 6 carbon atoms. Suitable alkylene halohydrins include ethylene halohydrin, propylene halohydrin and the like. Suitable alkylene carbonates include ethylene carbonate and propylene carbonate.

Catalysts for the hydroxyalkylation reaction include the alkali metal salts of aliphatic alcohols wherein the aliphatic group contains from 1 to 18 carbon atoms, including linear and branched chain alkyl groups. Examples of such catalysts are sodium methylate, potassium ethylate, sodium propylate, and the like. Other suitable catalysts include the salts of strong bases and weak acids, such as sodium acetate, potassium propionate and sodium benzoate. Other catalysts for the reaction include the alkali metal or alkaline earth hydroxides such as the hydroxides of sodium, potassium and calcium. In the foreoing description the alkali metals of interest are lithium, sodium, potassium, rubidium and cesium. The alkaline earth metals are calcium, barium, and strontium. Especially useful catalysts when the hydroxyalkylating agent is an alkaline carbonate are the alkali metal carbonates such as sodium and potassium carbonate.

The hydroxyalkylation reaction is generally carried out at a temperature in the range of about 100 to 250 degrees centigrade, preferably at a temperature in the range of 150 to 200 degrees centigrade. Reaction pressures from atmospheric to 100 pounds per square inch absolute and higher can be employed. Pressures above atmospheric, for example, about 25 to 75 pounds per square inch absolute are preferred when using the lower alkaline oxides as hydroxyalkylating agents. The reaction time can vary considerably, for example, in the range of about 1 to 5 hours is usual. It is desired to employ sufficient hydroxyalkylating agent to react at least one molecule of hydroxyalkylating agent per phenolic hydroxyl group. Generally, the hydroxyalkylation agent is employed in a proportion to provide from 1 to about 10 moles of hydroxyalkylation agent permole of phenolic hydroxyl group, preferably the ratio is in the range of 1 to about 6 moles of hydroxyalkylating agent per mole of phenolic hydroxyl group.

In accordance with the invention, the hydroxyalkylated phenol-aldehyde or phenol-ketone novolak resin is treated with phosphoric acid to adjust the acidity of the resinous composition to an acid number in the range of about 0.2 to 10, depending upon the characteristics of the polyurethane coating composition that are desired. The preferred range of acid number is about 1.5 to 7. When polyurethane coating compositions are desired that have the maximum corrosion resistance and most improved adhesion to metals, the acid number of the resin composition is adjusted to a value in the range of about 2 to about 4.5. The desired acidity adjustment is achieved by treating the resinous composition with phosphoric acid.

The phosphoric acid is mixed with the resinous composition in a suitable proportion to provide the desired acid number, and the composition is heated to a temperature of at least 160 degrees centigrade, preferably a temperature in the range of 170 to 190 degrees centigrade. Temperatures up to 220 degrees centigrade can be used, but are less preferred. Sufficient agitation is provided to insure good mixing of the acid phosphorus compound with the hydroxyalkylated novolak resin. Mixing is continued for a suitable length of time, generally in the range of about 10 minutes to two hours or more. Solid particles of impurities that result from the acid phosphorus treatment step can be separated from the resinous composition by a suitable means such as a filter or centrifuge. The separation is conveniently conducted in conventional, batch or continuously operated filters or centrifuges. Suitable equipment includes plate and frame batch filters, rotary filters, continuous discharge centrifuges, and the like.

The resinous composition that results from the acid phosphorus treatment step is dissolved in a solvent that will provide a suitable carrier for the finished polyurethane coating composition. Suitable solvents include aromatic hydrocarbons such as toluene and xylene, esters, of a carboxylic compound and an alcohol such as Cellosolve acetate (ethylene glycol monoethyl ether acetate), ethyl acetate, butyl acetate, ethyl propionate, ehyl butyrate, and the like. Ketones, such as the aliphatic ketones having 1 to 8 carbon atoms per aliphatic group, for example, acetone, methyl ethyl ketone, dibutyl ketone, methyl hexyl ketone, and the like, and chlorinated hydrocarbons such as trichloroethylene, perchloroethylene, and the like. Generally, the suitable solvents for use in the invention have a boiling point in the range of about 50 to 200 degrees centigrade, preferably in the range of about 70 to 170 degrees centigrade. Generally, the solvent is employed in a proportion to provide about 10 to 80 weight percent solids or nonvolatiles as determined by ASTM D-1644–59(Method A). More usually the range is about 25 to 75 weight percent solids, ideally in the range of 50 to 75 weight percent solids to save on storage space.

To improve the storage stability of the final polyurethane coating compositions, the solution of the acid treated hydroxyalkylated novolak resins are preferably dehydrated to reduce the water content thereof to a value of less than about 100 parts per million of water in the polyol solution. More preferably, the water content of the polyol solution is reduced to a value in the range of about 10 to about 75 parts per million of water in the polyol solution. The dehydration step is conveniently achieved by subjecting the polyol solution to an azeotrope distillation. Such distillation is generally carried out at a temperature in the range of 70 to 200 degrees centigrade and atmospheric pressure. However, higher and lower pressures, such as up to 30 pounds per square inch absolute can be used, and the temperature will vary accordingly. Preferably the distillation conditions are 70 to 160 degrees centigrade and atmospheric pressure. Other dehydration methods are useful including subjecting the polyol solution to chemical dehydrating agents such as molecular sieves, zeolites, and the like.

The acid treated hydroxyalkylated novolak resin is reacted with an organic polyisocyanate. Suitable polyisocyanates include the tolylene diisocyanates, particularly 2,4-tolylene diisocyanate; 2,6-tolylene diisocyanate and mixtures of the two isomers, especially mixtures of 80 percent of 2,4-isomer and 20 percent of 2,6-isomer. Crude mixtures which are commercially available are also useful. Other suitable polyisocyanates include methylene bis(4-phenyl isocyanate); hexamethylene diisocyanate; 1,5-naphthalene diisocyanate; 1,3-cyclopentylene diisocyanate; dimer acid diisocyanate; p-phenylene diisocyanate; 2,4,6-tolylene triisocyanate; 4,4',4''-triphenylmethane triisocyanate, as well as crude commercial mixtures of such organic polyisocyanates.

The organic polyisocyanate and the polyol component of the polyurethane composition are reacted in a suitable proportion to provide an excess of isocyanato groups based on the total number of hydroxyl groups and other equivalent groups, i.e., polycarboxylic, and the like. Generally, the components are employed in a proportion to provide at least about 1.5 isocyanato groups per hydroxyl or equivalent groups. By equivalent groups is meant carboxylic acid, carboxylic anhydride, amine, and the like groups that are reactive with isocyanato groups. Preferably, the ratio is in the range of about 1.7 to about 2.5 isocyanato groups per hydroxyl or equivalent group. Generally, the organic polyisocyanate is added to the polyol solution, but the polyol solution can also be added to a body of the organic polyisocyanate. The reaction is preferably conducted at moderate temperatures in the range of about 25 to about 120 degrees centigrade, preferably temperatures in the range of 40 to about 80 degrees centigrade.

It is also within the invention to employ the hydroxyalkylated novolak resin in combination with another polyhydroxy composition. Suitable polyhydroxy compounds include esters such as glycerides of saturated and unsaturated fatty acids and hydroxy fatty acids, e.g., castor oil, and etherified products such as oxyalkylated sucrose, oxyalkylated glycerol, and the like. Other useful combinations include combinations of the hydroxyalkylated novolak with a polyester resin or another polyether resin, or combinations of the three. Suitable polyesters of the reaction products of a polyhydric alcohol and a polycarboxylic compound, said polycarboxylic compound being either a polycarboxylic acid, a polycarboxylic acid anhydride, a polycarboxylic acid ester, a polycarboxylic acid halide or mixtures thereof. The carboxylic compounds can be aliphatic, cycloaliphatic, aromatic, or heterocyclic and either saturated or unsaturated. Among the polycarboxylic compounds which can be used to form the polyester are aliphatic acids such as adipic, succinic, glutaric, oxalic, and malonic. Other suitable acids include maleic, fumaric, phthalic, isophthalic, terephthalic, tetrachlorophthalic acid, chlorendic acid and the corresponding acid anhydrides, acid esters and acid halides. The preferred polyhydric alcohols are the difunctional alcohols such as ethylene glycol, propylene glycol, 1,4-butanediol, dipropylene glycol, other polypropylene glycols, butylene glycols, polybutylene glycols, and the like. The polycarboxylic compound and polyhydric alcohol are employed in a suitable ratio to provide the desired molecular weight polyester. The ratio of the polyhydric alcohol to the polybasic acid can be expressed as the hydroxyl-carboxyl ratio, which can be defined as the number of moles of hydroxyl groups to the number of moles of carboxyl groups in a given weight of resin. This ratio can be varied over a wide range, but generally is in the range of about 1.5:1 to 5:1.

Suitable polyethers for use in combination with the hydroxyalkylated novolak resin are the reaction products of (1) either a polyhydric alcohol, or a polycarboxylic acid, and (2) a monomeric 1,2-epoxide having a single 1,2-epoxy group. The typical polyhydric alcohols, polycarboxylic acids and monoepoxides which can be employed in producing the polyethers are any of the polyhydric alcohols, polycarboxylic acids and monoepoxides listed hereinbefore. Other additives can be employed in combination with the hydroxyalkylated novolak resins of the invention to impart special properties to the coating compositions of the invention. Such additives include: silicone additives to improve surface characteristics, and other properties of the cured film, pigments and dyes, and the like.

Various proportions of such polyesters and auxiliary polyether resins can be employed in the compositions of the invention. However, it is preferred that the hydroxyalkylated novolak resin comprise at least about 50 weight percent of the total polyol components.

The polyurethane coating compositions of the invention can be applied to various substrates such as metal, i.e., steel, aluminum, copper, brass and the like, wood, ceramics, glass, and to polymer compositions. The coating composition can be cured merely by exposure to atmospheric moisture. Alternatively the coating compositions can be cured with the aid of a suitable polyol, such as a dihydric alcohol, e.g., ethylene glycol, propylene glycol, butanediol, dipropylene glycol, other polypropylene glycols, polybutylene glycols, and the like. Other polyols known in the art can also be employed.

The following examples serve to further illustrate the invention, but are not intended to limit it. All parts are by weight and temperatures are in degrees centigrade unless indicated otherwise.

EXAMPLE 1

13,655 parts phenol, 68.3 parts oxalic acid and 27.4 parts Nacconal NRSF (sodium alkyl aryl sulfonate) were charged to a reactor and heated to 90 C. A low nitrogen gas flow was maintained throughout the novolak polyol preparation except when operating under vacuum or under pressure. 6,717 parts of 37.2 percent formaldehyde were added to the phenol-Nacconal NRSF-oxalic acid mixture at such a rate as to maintain a reflux. After all the formaldehyde had been added, the reaction mixture was refluxed for 1.5 hours or until the free formaldehyde content was less than 0.5 percent. The reaction mixtures was dehydrated under partial vacuum (16 to 20 inches of mercury) until the reactor temperature reached 130° C. Full vacuum was then applied. The novolak was dehydrated and dephenolated at 190–200° C. and 40–45 mm. Hg. An exposure of one to two hours under such conditions was sufficient to reduce the free phenol content to less than one percent. The novolak so prepared was a snow white brittle resin.

1,751 parts of the thus-prepared novolak resin were charged to a reactor and heated to 50° C. under a nitrogen gas atmosphere. 17.5 parts sodium acetate were added, the reactor was sealed and 29 inches of mercury vacuum was pulled on the reactor. The reactor was then sealed from the vacuum line and condenser system. 3,554 parts of propylene oxide were fed to the reactor through a sparger over a period of 3 hours and 33 minutes at a reaction temperature range of 142–155° C. and at a rate to avoid exceeding a pressure of 25 p.s.i.g. The reaction was exothermic and cooling was required to hold the temperature in the desired range. The reaction mixture was allowed to digest for an additional period of two hours at 148–151° C., during which period the pressure in the reactor gradually dropped as propylene oxide was consumed; nitrogen gas was fed into the reactor to maintain a pressure of 10.5–12.5 p.s.i.g The reactor was vented and purged with nitrogen gas for one-half hour at a reaction temperature of 150–151° C. Samples were taken for analytical data. 32.64 parts of phosphoric acid (85.6 percent phosphoric acid by weight) were added to the reaction mixture at a temperature of 150° C. while maintaining a nitrogen gas flow through the reactor. The temperature of the reaction mixture was increased to 180–185° C. for one hour. The reaction mixture was cooled and filtered at a temperature of 110° C. The final product was a clear liquid resin exhibiting a color of 1+ Gardner, a viscosity, Gardner, of Z6+49.7 sec., a hydroxyl number of 182, an acid number of 1.53 and a sodium content of 39 p.p.m.

EXAMPLES 2 to 5

Additional polyol compositions of the invention were prepared using the procedure of Example 1. The reagents, proportions of reagents and characteristics of the resulting products are set forth in Table I. The novolak resin prepared in Example 5 was oxyalkylated and acid treated as described in subsequent examples.

TABLE I

| | Example | | | |
|---|---|---|---|---|
| | 2 | 3 | 4 | 5 |
| Phenol, pts. by wt | 8,401 | 16,500 | 9,000 | 39,480 |
| Formaldehyde, 37.2 wt. percent | 4,132 | 6,050 | 4,427 | 22,400 |
| Oxalic acid, pts. by wt | 42.0 | 82.5 | 45.0 | 197.4 |
| Nacconol NRSF, pts. by wt | 16.8 | 33.0 | 18.0 | 79.0 |
| Hydroxylating agent, pts. by wt | a 17,899 | b 21,720 | b 15,475 | a 3,207 |
| Sodium acetate, pts. by wt | 124.3 | 56.8 | 37.6 | |
| Gardner color of resin | (c) | (c) | 5–6 | |
| Hydroxyl number of resin | 157 | 190 | b 187 | a 156 |
| Alkaline number of resin | 1.6 | 0.3 | 0.2 | Neutral |
| Quantity of resin acidified with $H_3PO_4$ | 1,065 | 3,325 | | |
| Designated as resin | 2A | 3A | 4A | 4B |
| Quantity of 100% $H_3PO_4$ used | 5.85 | 10.35 | | |
| Time, hour | 1 | 1 | 1 | |
| Temp., °C. of acidification | 180–185 | 180–186 | 180–185 | |
| Hydroxyl number after acidification | 154 | 188 | 153 | |
| Acid number after acidification | 1.3 | 1.4 | 3.6 | | a Ethylene oxide.
b Propylene oxide.
c Light amber.

EXAMPLES 6 to 12

Additional hydroxyalkylated novolak resins were prepared and treated in the following manner and the reagents and proportions and characteristics of the resulting products are presented in Table II. In Examples 6 to 9, the novolak resin prepared as described in Example 1 was oxyalkylated and treated with phosphoric acid according to the procedure of Example 1, but using the proportions and conditions set forth in Table II.

In Example 10, the novolak resin of Example 5 was oxyalkylated and treated with phosphoric acid according to the procedure of Example 1, but using the proportions and conditions set forth in Table II. In Example 11, the novolak of Example 1 was oxyalkylated using the procedure of Example 1, and the conditions and proportions set forth in Table II. However, in this Example 11, the oxyalkylated novolak resin was not acid treated. In Example 12, 500 parts of the oxyalkylated novolak resin of Example 11 was treated with phosphoric acid.

EXAMPLE 13

1,000 parts of refiltered novolak polyol of Example 6 and 3.91 parts of phosphoric acid (85.4 percent) were agitated and heated under a nitrogen atmosphere to 181–182° C. for 54 minutes. The reaction product was then cooled and filtered through #4 Whatman paper at 100–103° C.

The product of this reaction had a color, Gardner, of 2, a viscosity, Gardner, of Z6+55.7 sec., an acid number of 6.7, and a sodium content of 22 p.p.m.

EXAMPLE 14

Polyurethane composition 376.9 parts of the acid treated polyol prepared in Example 2, designated 2A, were dissolved in 243.8 parts of "urethane grade" Cellosolve acetate and 309.8 parts of xylene. The solution was heated to reflux, and 34.7 parts of xylene were removed. Then 860.1 parts of the resulting polyol solution (containing 993 millimoles of hydroxyl) were added to and reacted with 166.0 parts of tolylene diisocyanate (1908 isocyanate millimoles). 30 parts of Cellosolve acetate were used to wash the polyol solution. The polyol solution was added to the isocyanate over a period of 2 hours and 6 minutes at 39 degrees centigrade. Then the mixture was stirred and digested for 5.5 hours at 40 degrees centigrade and 6.5 hours at 80 degrees centigrade. The resulting coating composition had the following characteristics:

Viscosity, Gardner—H+
Color, Gardner—2+
Percent NCO—3.54
Nonvolatiles, percent—49.0
Brookfield viscosity:
    After 24 hours—284 centipoises at 29°
    After 25 days—350 centipoises at 25°

EXAMPLE 15

A polyurethane composition was prepared by first dissolving 313.4 parts of acid treated polyol prepared in Example 3, designated 3A, in 504 parts by weight of mixed xylene isomers. The solution was refluxed for 1.5 hours and 43.4 parts of xylene distilled. Then 736.9 parts by weight of polyol solution (containing 1000 hydroxyl millimoles) were added to and reacted with 165.8 parts by weight of tolylene diisocyanate using 30 parts by weight of Cellosolve acetate wash solvent. The addition was made over a 112-minute period at 39–40 degrees. Stirring was commenced, and after 20 minutes at 40 degrees, 0.371 part dibutyltin dilaurate was added, and digestion-stirring was continued for 12 hours at 40 degrees centigrade. The resulting composition had the following characteristics:

Viscosity, Gardner—A—
Color, Gardner—5—
Percent NCO—4.09
Nonvolatiles, percent—48.2
Weight per gallon, pounds/gallon—8.32
Brookfield viscosity: Centipoises at 26° C—7

TABLE II

| | Example No. | | | | | | |
|---|---|---|---|---|---|---|---|
| | 6 | 7 | 8 | 9 | 10 | 11 | 12 |
| Parts of novolak | 11,351 | 1,753 | 1,753 | 1,753 | 1,546 | 1,751 | a) |
| Parts of hydroxyalkylating agent | b 22,384 | b 3,554 | b 3,554 | b 3,554 | b 4,574 | b 3,554 | |
| Parts of sodium acetate | 56.8 | 17.51 | 17.51 | 17.51 | 15.44 | c 8.8 | |
| Parts of $H_3PO_4$ | 79.3 (85.6%) | 44.26 (98%) | 40.8 (85.6%) | 44.88 (85.6%) | 36.0 | | 10.6 (85.6%) |
| Na+ content (p.p.m.) | 51–80 | 25 | 37 | 38 | 15 | 945 | 85 |
| Acid number | 0.35 | 4.3 | 2.0 | 3.0 | 0.42 | d 1.0 | 15 |
| Color Gardner | 2– | 2 | 1+ | 1+ | 2 | 3–4 | 3– |
| Viscosity Gardner | Z6–Z7 | Z6+ 126.8 sec. | Z6+ 88.2 sec. | Z6+ 107.4 sec. | Z5– 21.4 sec. | Z6+ 123.6 sec. | Z6+ 187.3 sec. |
| OH number | 118 | 182 | 180 | 178 | 140 | 187 | 177 | a 500 parts of oxyalkylated resin of Ex. 11.
b Propylene oxide.
c Sodium methylate.
d Alkalinity number.

The coating composition was applied to a glass substrate, and cured by atmospheric moisture. The water resistance properties of the cured coating were determined and compared with two commercial coatings of the same type. The following results were obtained:

|  | Example 15 | Commercial coating A | Commercial coating B |
|---|---|---|---|
| Immersed in distilled water one week | No change | Extensive microblistering; partial loss of adhesion. | Slight microblistering; partial loss of adhesion. |
| Immersed in boiling distilled water two hours | Slight change | Complete loss of adhesion in 60 minutes. | Microblistered; complete loss of adhesion in 10 minutes. |

EXAMPLE 16

2,000 parts of polyol prepared as in Example 4, and designated 4B were dissolved in 291 parts of Cellosolve acetate and 2,884 parts of xylene. The solution was refluxed for 3.25 hours during which time 264.7 parts of xylene were removed. Then 998.2 parts by weight of the resulting polyol solution (containing 1109 hydroxyl millimols) were added to and reacted with 186.2 parts of tolylene diisocyanate (2,140 isocyanate millimoles). The addition period required 2.25 hours at 60 degrees. After 20 minutes of digestion stirring at 60 degrees centigrade, 1.19 parts of dibutyltin dilaurate were added. Digestion stirring was continued at 60 degrees for nearly 7 hours at 60 degrees centigrade, followed by digestion-stirring of 1.25 hours at 80 degrees centigrade. The coating composition had the following characteristics:

Color, Gardner—7+
Percent nonvolatiles—49.1
Weight/gallon—8.33
Percent NCO—3.60
Brookfield viscosity (centipoises at 26° C)—150

EXAMPLE 17

Auxiliary polyhydroxy compound

A polyol solution was prepared by dissolving 2,387.2 parts by weight of the polyol of Example 6, 667.8 parts by weight of castor oil (OH number 168, acid number 0.6) and 0.12 $SnCl_2 \cdot 2H_2O$ in 1,743.4 parts by weight of xylene. The solution was refluxed for 5 hours and 43 minutes, during which time 175.3 parts of xylene distilled. 4,200 parts of the resulting solution (9,057 millimoles of hydroxyl) were added to and reacted with 1,499 parts of tolylene diisocyanate (80 percent of 2,4- isomer and 20 percent of 2,6- isomer) in 4 hours, 13 minutes at 31 to 38 degrees centigrade. There followed a digestion stirring period of about 10 hours at 35 to 42 degrees centigrade. The coating composition had the following properties:

Viscosity, Gardner—Z–2+6.1 secs.
Color, Gardner—2—
Percent nonvolatiles—73.5
Weight per gallon, pounds/gallon—8.84
Percent NCO—6.08

The thus-prepared vehice was diluted to 50.13 weight percent nonvolatile with xylene, and mixed with dibutyltin dilaurate and a silicone additive. The diluted vehicle was used in Example 37, described hereinafter.

EXAMPLE 18

Effect of high acid number

The acid treated polyol of Example 12 (350 parts by weight), having an acid number of 15 was dissolved in 565.1 parts of xylene and distilled for 3 hours until 66.8 parts of xylene were removed. The remaining polyol solution was added to and reacted with 198 parts of tolylene diisocyanate (2276 millimoles of isocyanate) at 38 to 42 degrees centigrade over an addition period of about 2 hours. The solution was digested and stirred for about 8.25 hours, then 0.109 part of dibutyltin dilaurate was added to the reaction mixture and digestion stirring continued for about an hour at 39 to 40 degrees centigrade. An additional 0.987 part of dibutyltin dilaurate was added, and digestion stirring was continued for 2 hours, 6 minutes, and for 6 hours, 38 minutes at 59 to 60 degrees centigrade. The reaction proceeded very slowly. The resulting polyurethane coating composition had the following properties:

Viscosity, Gardner—9
Color, Gardner—9—
Percent NCO—4.34
Percent nonvolatiles—48.6

Thus it was found that the composition produced from a high asid number polyol had very poor color.

EXAMPLE 19

200.4 parts of castor oil, 716.2 parts of novolak polyol resin as prepared in Example 6, 0.0918 part of $SnCl_2$, 141.5 parts of Cellosolve acetate, 1273.8 parts of xylene plus another 43.5 parts of xylene for azeotropic distillation were charged to a reaction vessel equipped with agitation, a water separator, a water cooled condenser and nitrogen inlet. The reaction mixture was heated under agitation and a nitrogen atmosphere to reflux, and the moisture in the reaction mixture removed by azeotropic distillation. The refluxing was continued for 2 hours and 25 minutes at which time 43.5 parts of xylene were removed from the reaction mixture via the water separator and the reaction mixture cooled.

To the dehydrated reaction mixture were added 495.9 parts of toluene diisocyanate (an 80/20 mixture of 2,4- and 2,6- isomers commercially available under the name Nacconate 80) in a 7 minute period at 39° C. The reaction mixture was held at 39–44° C. for an additional 2 hour and 4 minute period. The reaction mixture was then heated to 78.5–79° C. for 4 hours at which time a sample withdrawn from the reaction mixture analyzed for an isocyanate value of 4.32 indicating that 93 percent of the desired completion had been achieved. 2.8 parts of dibutyl-tindilaurate were then added to the reaction mixture at 78.5° C. and the mixture cooled.

The following day the product was filtered and then analyzed and found to exhibit the following physical characteristics:

Viscosity, Gardner _____ B+
Color, Gardner _____ 2
Clarity _____ Clear
Percent nonvolatile _____ 49.3
Percent NCO _____ 4.07

A 1.5 mil (wet) film of the above product cast on a glass plate and cured under ambient conditions exhibited a hard dry in 4–4½ hours and a Sward hardness of 48 after a 24-hour cure. Films cured on metal plates showed good flexibility, impact resistance and abrasion resistance indicating that the formulation would serve as a good vehicle for clear varnishes and/or pigmented protective coatings.

EXAMPLES 20 to 35

In the following examples, the procedure specified in Example 19 was essentially used, but different concentrations of reactants, solvents and/or different reactants and/or solvents were used as specified in Table III. Polyester designated (1) was a commercial polyester of a dicarboxylic acid and a dihydric alcohol having a hydroxyl number of about 35. Polyester designated (2) was a commercial polyester of a dicarboxylic acid and a dihydric alcohol having a hydroxyl number of about 90. The polyisocyanate was a mixture of 80 weight percent of 2,4-tolylene diisocyanate and 20 weight percent of 2,6-tolylene diisocyanate.

Example 20 were 0.61–0.79 mil while the thickness of the commercial samples were 0.61–0.90 mil.

EXAMPLE 37

Vehicles prepared in Example 17 and Example 25,

TABLE III

| Example | Novolak polyol | Castor oil | Polyester | Polyisocyanate | Dibutyl tin-dilaurate | SnCl₂ | Xylene | Cellosolve acetate | Viscosity Gardner | Color Gardner | Percent NCO | Non-volatile |
|---|---|---|---|---|---|---|---|---|---|---|---|---|
| 20 | 299.8 (per Ex. 6) | | 78.1 (1) | 174.4 | 1.05 | | 55.2.3 | | D–E | <1 | 3.54 | 49.6 |
| 21 | 929.4 (per Ex. 6) | | 242.1 (1) | 540.5 | 3.4 | | 1,543.9 | 171.5 | E+ | 1 | 3.67 | 49.4 |
| 22 | 718.9 (per Ex. 6) | 102.7 | 205.4 (1) | 470.9 | 2.04 | | 1,350 | 150 | B+ | 2–3 | 3.39 | 49.6 |
| 23 | 308.2 (per Ex. 1) | | | 165.3 | 0.95 | 0.024 | 426.2 | 47.3 | H+ | 1–2 | 3.88 | 49.9 |
| 24 | 308.2 (per Ex. 1) | | 63.7 (2) | 182.5 | 1.11 | | 499 | 55.4 | E+ | 1 | 3.65 | 50.4 |
| 25 | 253 (per Ex. 13) | 70.8 | | 175.2 | | | 450 | 50 | B+ | 5 | 3.99 | 49.2 |
| 26 | 308.2 (per Ex. 7) | | 63.7 (2) | 182.5 | 1.2 | | 500 | 55.6 | E+ | 2 | 3.71 | 49.2 |
| 27 | 400.7 (per Ex. 7) | | | 214.9 | 1.3 | | 555.2 | 61.7 | P–0.4 sec. | 3 | 3.90 | 50.1 |
| 28 | 400.7 (per Ex. 7) | | | 214.9 | 1.3 | 0.031 | 555.2 | 61.7 | K+0.2 sec. | 3+ | 3.90 | 49.8 |
| 29 | 308.2 (per Ex. 7) | | 80.3 (1) | 173.7 | 1.1 | | 507 | 56.3 | I+ | 3+ | 3.49 | 49.2 |
| 30 | 311.7 (per Ex. 8) | | 81.2 (1) | 173.9 | 1.1 | | 510.1 | 56.7 | I+0.3 sec. | 1 | 3.45 | 49.8 |
| 31 | 311.7 (per Ex. 8) | | | 165.3 | 0.95 | 0.024 | 429.3 | 47.7 | J– | 3 | 3.50 | 49.4 |
| 32 | 315.2 (per Ex. 9) | | 82.1 (1) | 174.0 | 1.1 | | 514.2 | 57.1 | O–0.4 sec. | 2 | 3.37 | 50.3 |
| 33 | 315.2 (per Ex. 9) | | | 165.3 | 0.96 | 0.026 | 432.4 | 48.1 | E+ | 3 | 3.77 | 49.4 |
| 34 | 514.1 (per Ex. 7) | 139.2 | | 344.6 | 2.0 | | 900 | 100 | D–E | 3– | 3.90 | 49.6 |
| 35 | 519.7 (per Ex. 9) | 137.6 | | 340.7 | 2.0 | | 900 | 100 | F– | 3– | 3.76 | 49.9 |

EXAMPLE 36

Standard 3" x 5" steel Parker panels were cleaned and then dip coated with vehicle prepared in Example 20. Control panels were prepared in the same manner using a commercially available moisture curable polyurethane. The films were cured for approximately 24 hours and then completely immersed in 65° C. distilled water for 5 days (edges of panels were taped to eliminate any edge effect).

The panels coated with vehicle prepared in Example 20 exhibited light black spot corrosion with a few severe black spots on the front side of the panel (ground side) while the back side (cold rolled side) exhibited severe black spot corrosion and rough film over the corroded area. The panels cotated with the commercial polyurethane exhibited moderate black spot corrosion on the front side and light black spot corrosion on the back side. Film thickness of the samples prepared from vehicle of and a commercially available moisture curable polyurethane, were used to coat a series of standard 3" x 5" Parker steel panels by dip coating. A series of standard 3" x 5" Parker steel panels which had been treated with a commercially available zinc phosphate conversion coating were also dip coated with the aforementioned vehicles. The coated panels were moisture cured under ambient conditions for approximately one day and then subjected to approximately a 5-day total immersion in 65° C. distilled water.

Knife adhesion tests were run immediately upon withdrawal of the panels from the 65° C. bath and after approximately a one-half hour recovery period. The following observations were recorded:

|  | Vehicle of Example 25 | | Vehicle of Example 17 | | Commercial Vehicle A | |
|---|---|---|---|---|---|---|
| Adhesion on zinc phosphate treated panels | Front | Back | Front | Back | Front | Back |
| Immediately after immersion | 9–10 | 9+ | 9+ | 9+ | 9+ | 9+ |
| After ½ hour recovery | 10 | 10 | 10 | 9½–10 | 9–10 | 9–10 |
| Adhesion on untreated panels: | | | | | | |
| Immediately after immersion | 7 | 5 | 1 | 1 | 7 | 1½ |
| After ½ hour recovery | 8½ | 8½ | 1 | 1 | 7 | 2 |
| Corrosion resistance, zinc phosphate treated panels: | | | | | | |
| Front | No change | | Moderate rusting | | Moderate rusting | |
| Back | No change | | Moderate rusting | | Moderate rusting | |
| Untreated panels: | | | | | | |
| Front | No change | | Trace to slight black spot corrosion | | Moderate to black spot corrosion | |
| Back | No change | | No change | | Moderate to severe black spot corrosion | |
| Film thickness | 0.91–1.2 | | 0.75–1.5 | | 0.80–1.0 | |

For Adhesion: 1=Very poor; 10=Excellent.

EXAMPLE 38

Steel panels were dip coated with vehicles from Examples 23 and 24 and a commercial vehicle, and were tested in essentially the same manner as described in Example 36. In addition, knife adhesion tests were run in essentially the same manner as described in Example 37.

The following data was observed:

|  | Commercial Vehicle A | | Vehicle of Example 23 | | Vehicle of Example 24 | |
| --- | --- | --- | --- | --- | --- | --- |
|  | Front | Back | Front | Back | Front | Back |
| Adhesion before immersion | 9½ | 9½ | 8 | 8 | 7 | 7½ |
| Adhesion immediately after immersion | 2 | 1 | 1-2 | 1-2 | 1 | 1 |
| Adhesion after a ½ hour recovery | 6 | 6½ | 8-8½ | 7½ | 1 | 1 |
| Corrosion resistance: | | | | | | |
| Front | Severe microblack spot corrosion | | Moderate microblack spot corrosion | | Moderate microblack spot corrosion | |
| Back | Severe microblack spot corrosion | | Moderate microblack spot corrosion | | Severe to very severe microblack spot corrosion | |
| Film thickness | 0.90-0.95 | | 0.9-1.5 | | 0.9-1.7 | |

For adhesion 1=Very poor; 10=Excellent

EXAMPLE 39

Using essentially the same procedure as in Example 36, steel panels were dip coated with two commercially available moisture curable polyurethanes, and with vehicles from Examples 19 and 21. The following data was observed:

|  | Commercial A | Commercial B | Example 19 | Example 21 |
| --- | --- | --- | --- | --- |
| Front of panel | Moderate to severe black spot corrosion. | Slight black spot corrosion. | Severe black spot corrosion. | Trace black spot corrosion. |
| Back of panel | Severe black spot corrosion. | Slight black spot corrosion. | Very severe black spot corrosion. | Moderate to severe black spot corrosion. |
| Film thickness | 0.93-1.2 | 0.60-0.75 | 0.70-0.75 | 0.90-0.95 |

EXAMPLE 40

Using essentially the same procedure as in Example 36, standard 3" x 5" Parker steel panels were dip coated with vehicles from Examples 30, 31, 32 and 33. The films were cured under ambient conditions for approximately 24 hours, and then subjected to a 4 day total immersion in 65° C. distilled water. The following results were obtained. The panels used for measuring adhesion before immersion were not tested in the 65 degree water bath.

|  | Vehicle of Example 30 | | Vehicle of Example 31 | | Vehicle of Example 32 | | Vehicle of Example 33 | |
| --- | --- | --- | --- | --- | --- | --- | --- | --- |
| Adhesion (Knife) | Front | Back | Front | Back | Front | Back | Front | Back |
| Before immersion | 8 | 8 | 8 | 8 | 8 | 7½ | 8 | 8 |
| After immersion | 2 | 2 | 6½-7 | 1½ | 2 | 2 | 8-8½ | 3-8 |
| ½ hour recovery | 7 | 7-7½ | 8-½-9½ | ¹8 | 7½-8 | 3 | 9-9½ | 7½-8½ |
| Corrosion | Trace to none | | Trace to none | | Trace to none | | Trace to none | |
| Film thickness, mils | 0.68-1.0 | | 0.71-1.0 | | 0.65-0.82 | | 0.72-1.3 | |

¹ Brittle.
For adhesion.—1=Very poor; 10=Excellent.

EXAMPLE 41

Standard steel 3" x 5" Parker panels were coated with vehicle from Examples 26, 27, 28, 29, 34 and 35 using essentially the same procedure as in Example 36. The films were moisture cured for approximately one day under ambient conditions and then subjected to a 5 day at 65° C. distilled water total immersion. The results obtained are shown in Table IV.

TABLE IV

|  | Vehicle of Example 26 | | Vehicle of Example 27 | | Vehicle of Example 28 | | Vehicle of Example 29 | | Vehicle of Example 34 | | Vehicle of Example 35 | |
| --- | --- | --- | --- | --- | --- | --- | --- | --- | --- | --- | --- | --- |
| Adhesion (Knife) | Front | Back | Front | Back | Front | Back | Front | Back | Front | Back | Front | Back |
| After immersion | 1 | 1 | 8 | 7½-8 | 7½-8 | 8 | 1 | 1 | 5½-6½ | 5-6 | 5-7½ | 5-7½ |
| Before immersion ¹ | | | | | | | | | 9½ | 9½ | 9½ | 9½ |
| ½ hour recovery | 4 | 1½ | 9-9½ | 9 | 8½-9 | 9 | 2 | 1 | 6-8 | 6½-8 | 7½-8 | 7-8 |
| 2 hour recovery | | | | | | | | | 6-7 | 6-7 | 7-8 | 7-8½ |
| Corrosion: | | | | | | | | | | | | |
| Front | Trace to slight | | None | | None | | None | | None | | None | |
| Back | None | | None | | None | | None | | None | | None | |
| Film thickness, mils | 0.75-1.0 | | 0.70-0.85 | | 0.65-0.85 | | 0.65-1.0 | | 0.75-1.3 | | 0.77-1.4 | |

¹ Two panels for each formulation which were not used for subsequent immersion test.
For adhesion.—1=Very poor; 10=Excellent.

EXAMPLE 42

Standard 3" x 5" Parker steel panels were cleaned and dip coated with vehicles from Examples 23 and 33 and a commercially available moisture curable polyurethane. The films were moisture cured under ambient conditions for one week. The panels were then totally immersed in a 65° C. distilled water bath for 5 days. The following results were then recorded:

|  | Commercial A | Vehicle from Example 23 | Vehicle from Example 33 |
| --- | --- | --- | --- |
| Front | Severe microblack spot corrosion and very severe microblistering. | Slight to none | None. |
| Back | do | Moderate to severe microblack spot corrosion. | Do. |
| Average thickness, mils | 0.65-0.92 | 0.75-1.0 | 0.61-0.80. |

EXAMPLE 43

Other useful resins are prepared by reacting the novolak of Example 1 with ethylene chlorohydrin in the presence of aqueous sodium hydroxide solution and ethanol solvent. The reaction mixture is refluxed until free of phenolic hydroxyl, the alcohol is distilled off, and the resin is washed with water and dried.

Other useful resins are prepared by reacting the novolak of Example 1 with ethylene carbonate in the presence of potassium carbonate until the resin is free of phenolic hydroxyl.

The data presented in the foregoing examples clearly indicates the superior corrosion resistance obtained when the polyurethane coating compositions of the invention are employed, compared to the results obtained with commercially available polyurethane coatings. Improved adhesion to metals is also exhibited by the cured coatings of the invention. The coating compositions of the invention are also storage stable. The data presented herein also shows that especially good corrosion and improved adhesion to metals is achieved when the acid number of the polyol of the invention is adjusted to the range of about 1.5 to 7.

Products having the best overall properties, including color, are obtained when the acid number of the polyol of the invention is in the range of about 2 to 4.5.

In preparing the polyurethane compositions of the invention, the reaction of the polyol component with the polyisocyanate is facilitated by the use of an alkylation carboxylate, especially the dialkylation dicarboxylates, such as dibutyltin dilaurate, dibutyltin diacetate, dibutyltin dimaleate, and the like. The tin compound is preferably employed in the proportion of about 0.05 to 0.8 weight percent based on the total weight of polyol and polyisocyanate.

While the invention has been described with reference to certain specific embodiments, it will be recognized by those skilled in the art that many variations are possible without departing from the spirit and scope of the invention.

We claim:

1. A polyurethane coating composition comprising a polyurethane composition produced by reacting an equivalent excess of an organic polyisocyanate with one equivalent of a polyhydroxy composition, wherein the polyhydroxy composition comprises a polyol formed by adjusting the acidity of a hydroxyalkylated novolac resin of a phenol and a carbonyl compound selected from the group consisting of an aldehyde and a ketone with phosphoric acid to an acid number in the range of about 0.2 to about 10, and heating the resulting product to a temperature of at least 160 degrees centigrade, wherein the hydroxyalkylated novolac resin has greater than 0.25 up to nearly one mole of carbonyl compound per mole of phenol and 1 to 10 moles of a hydroxyalkylating agent selected from the group consisting of monooxirane ring compounds, alkylene halohydrins and alkylene carbonates per mole of phenolic hydroxyl group; and a solvent for said polyurethane composition.

2. The composition of claim 1 wherein the novolak resin is a product of phenol and an aldehyde.

3. The composition of claim 2 wherein the aldehyde is formaldehyde.

4. The composition of claim 2 wherein the hydroxyalkylated phenol-aldehyde novolak resin is produced by reacting a phenol-aldehyde novolak resin with an alkylene oxide.

5. The composition of claim 2 wherein the organic polyisocyanate and polyhydroxy composition are reacted in a proportion to provide at least 1.5 isocyanato groups per hydroxyl or equivalent group.

6. The composition of claim 1 wherein the polyhydroxy composition also comprises an auxiliary polyhydroxy compound.

7. The composition of claim 6 wherein the auxiliary polyhydroxy compound is castor oil.

8. The composition of claim 6 wherein the auxiliary polyhydroxy compound is a polyester of a dicarboxylic compound and a dihydric alcohol.

9. The composition of claim 3 wherein the solvent has a boiling point in the range of about 50 to about 200 degrees centigrade.

10. The composition of claim 10 wherein the solvent is an aromatic hydrocarbon.

11. The composition of claim 11 wherein the aromatic hydrocarbon is xylene.

12. The composition of claim 10 wherein the solvent is an ester of a polycarboxylic compound and an alcohol.

13. The compositon of claim 13 wherein the solvent is ethylene glycol monoethyl ether acetate.

14. A cured polyurethane coating prepared by subjecting the composition of claim 1 to atmospheric moisture.

15. A process for preparing a polyurethane composition which comprises:
(1) adjusting the acidity of a hydroxyalkylated novolac resin of a phenol and a carbonyl compound selected from the group consisting of an aldehyde and a ketone with phosphoric acid to an acid number in the range of about 0.2 to about 10, wherein the hydroxyalkylated novolac resin has greater than 0.25 up to nearly 1 mole of carbonyl compound per mole of phenol and 1 to 10 moles of hydroxylating agent selected from the group consisting of monooxirane ring compound, alkylene halohydrins and alkylene carbonates per mole of phenolic hydroxyl group,
(2) heating the resulting polyol product to a temperature of at least 160 degrees centigrade, and
(3) reacting the resulting polyol product with an organic polyisocyanate in a proportion to provide at least about 1.5 isocyanato groups per hydroxyl or equivalent group.

16. The process of claim 15 wherein a precipitate formed in step (2) is separated from the polyol product prior to reaction with the polyisocyanate.

17. The process of claim 16 wherein the precipitate-free polyol product is dissolved in a solvent having a boiling point in the range of about 50 to about 200 degrees centigrade,
the resulting polyol solution is dehydrated to reduce the water content to a value of less than about 100 parts per million of water in the polyol solution, and the resulting polyol solution is reacted with the organic polyisocyanate.

18. The process of claim 17 wherein the novolak resin is the product of phenol and an aldehyde, and the novolak resin is hydroxyalkylated with an alkylene oxide.

19. The process of claim 18 wherein the aldehyde is formaldehyde.

20. The process of claim 17 wherein the precipitate-free polyol product is admixed with an auxiliary polyhydroxy compound prior to dissolution in the solvent.

References Cited

UNITED STATES PATENTS

| | | | |
|---|---|---|---|
| 2,788,335 | 4/1957 | Barthel | 260—2.5 |
| 3,054,756 | 9/1962 | Holtschmidt et al. | 260—2.5 |
| 3,257,337 | 6/1966 | Schoepfle et al. | 260—77.5 |

DONALD E. CZAJA, Primary Examiner

W. E. PARKER, Assistant Examiner

U.S. Cl. X.R.

117—123, 132, 148, 161; 261—31.2, 31.4, 32.6, 33,6, 33.8, 50, 59, 77.5, 838, 858